United States Patent
Kraft et al.

(10) Patent No.: US 10,666,601 B2
(45) Date of Patent: May 26, 2020

(54) DEVICE, SYSTEM AND METHOD FOR CONNECTING FIELDBUS DEVICES TO THE INTERNET

(71) Applicant: Deutsche Telekom AG, Bonn (DE)

(72) Inventors: Andreas Kraft, Berlin (DE); Hans-Werner Bitzer, Berlin (DE); Thomas Jenschar, Berlin (DE); Alexander Manecke, Berlin (DE); Andreas Sayegh, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 239 days.

(21) Appl. No.: 15/518,248

(22) PCT Filed: Oct. 13, 2015

(86) PCT No.: PCT/EP2015/073627
§ 371 (c)(1),
(2) Date: Jun. 26, 2018

(87) PCT Pub. No.: WO2016/059021
PCT Pub. Date: Apr. 21, 2016

(65) Prior Publication Data
US 2018/0359213 A1    Dec. 13, 2018

(30) Foreign Application Priority Data
Oct. 13, 2014  (EP) .................................. 14188644

(51) Int. Cl.
G06F 15/16         (2006.01)
H04L 29/12         (2006.01)
(Continued)

(52) U.S. Cl.
CPC ........ H04L 61/106 (2013.01); H04L 12/2836 (2013.01); H04L 12/66 (2013.01); H04L 61/2015 (2013.01); H04L 61/2038 (2013.01); H04L 61/6059 (2013.01); H04L 61/6081 (2013.01)

(58) Field of Classification Search
CPC ........................... H04L 12/2836; H04L 12/66
See application file for complete search history.

(56) References Cited

U.S. PATENT DOCUMENTS

2005/0033886 A1*  2/2005  Grittke ................ H04L 63/0846
                                                    710/107
2009/0175284 A1*  7/2009  Fujisawa ........... H04L 29/12358
                                                    370/401
(Continued)

FOREIGN PATENT DOCUMENTS

| EP | 1770528 A2 | 4/2007 |
|---|---|---|
| EP | 2367337 A1 | 9/2011 |
| WO | WO 2014037779 A1 | 3/2014 |

*Primary Examiner* — Hieu T Hoang
(74) *Attorney, Agent, or Firm* — Leydig, Voit & Mayer, Ltd.

(57) ABSTRACT

A gateway device includes: a network adapter for connection to an IPv6 network; a fieldbus network adapter for connection to an associated fieldbus; and an address assignment device for configuring one or more virtual IPv6 network adapters for one or more devices connected to the fieldbus, wherein an individual IPv6 address corresponds to each device connected to the fieldbus.

13 Claims, 2 Drawing Sheets

(51) Int. Cl.
*H04L 12/28* (2006.01)
*H04L 12/66* (2006.01)

(56) References Cited

U.S. PATENT DOCUMENTS

| | | | | |
|---|---|---|---|---|
| 2012/0099579 | A1* | 4/2012 | Kim | H04W 4/18 |
| | | | | 370/338 |
| 2012/0195431 | A1* | 8/2012 | Garcia Morchon | H04W 12/06 |
| | | | | 380/270 |
| 2012/0209951 | A1* | 8/2012 | Enns | H04L 29/08729 |
| | | | | 709/217 |
| 2012/0213098 | A1* | 8/2012 | Sun | H04W 24/08 |
| | | | | 370/252 |
| 2013/0070745 | A1* | 3/2013 | Nixon | H04L 45/74 |
| | | | | 370/338 |
| 2013/0191635 | A1* | 7/2013 | Oba | H04L 9/088 |
| | | | | 713/168 |
| 2014/0039825 | A1* | 2/2014 | Antonini | G08B 21/12 |
| | | | | 702/121 |
| 2014/0325081 | A1* | 10/2014 | Heinrich | H04L 29/08792 |
| | | | | 709/228 |
| 2015/0032898 | A1* | 1/2015 | Tan | H04L 61/1535 |
| | | | | 709/227 |
| 2016/0337327 | A1* | 11/2016 | Borean | H04W 84/18 |

\* cited by examiner

DEVICE, SYSTEM AND METHOD FOR CONNECTING FIELDBUS DEVICES TO THE INTERNET

CROSS-REFERENCE TO RELATED APPLICATIONS

This application is a U.S. National Phase application under 35 U.S.C. § 371 of International Application No. PCT/EP2015/073627, filed on Oct. 13, 2015, and claims benefit to European Patent Application No. EP 14188644.0, filed on Oct. 13, 2014. The International Application was published in German on Apr. 21, 2016 as WO 2016/059021 A2 under PCT Article 21(2).

TECHNICAL FIELD

The invention relates to a device, a system, an application server and a method for connecting fieldbus devices to the Internet, in particular devices connectable to a fieldbus which is located in a local network and connected to the Internet via an IPv6-2-x gateway.

BACKGROUND

In a local network, such as in a connected home, various devices, e.g. consumer electronics and sensor technology devices and actuator devices, e.g. motion detectors, heating thermostats, can be connected to each other. Nowadays such devices, in particular devices with sensors or actuators are usually not connected via an Internet Protocol (IP) connection but via a so-called fieldbus (cf. http://de.wikipedia.org/w/index.php?title=Feldbus&oldid=133675829) (https://en.wikipedia.org/wiki/Fieldbus). Fieldbuses are usually not compatible with the International Standards Organization (ISO)/Open Systems Interconnection (OSI) layer model. Said fieldbuses or bus systems such as ZigBee or ZWave are special, non-Internet-protocol-based bus technologies which have been optimized for use in a locally restricted field, e.g. with regard to the choice of radio frequency bands and energy consumption. Accordingly, identification or addressing of devices connected to such fieldbuses is usually not directly possible from an IP-based network.

In order to be able to have access from an IP network to devices which are connected to such a fieldbus, special components are required. Said components implement the access to the fieldbus on the one hand via hardware and software and on the other hand via IP technologies. Said components are called gateway (cf. http://de.wikipedia.org/w/index.php?title=Gateway_(Informatik)&oldid=131744869) (https://en.wikipedia.org/wiki/Gateway_(telecommunications))

Generally, such a gateway implements the access to the individual devices connected to the fieldbus such that there is a single IP protocol channel for all devices. They are unambiguously identified, e.g. via a number and then controlled individually via a gateway-internal processing component in the fieldbus. Thus, a conversion of n devices to one IP connection to the gateway takes place. Consequently, the gateway carries out a double-sided mapping of devices to internal identification numbers.

In practice, the implementation of gateways results in problems regarding data and access security. Targets for malware may result from the manipulation of the addressing of devices. An access to a common gateway also enables access to all devices connected hereinafter. Conventional technology relies on the usual safety measures in the home network (e.g. a firewall in the home router). In case of manipulations, the weak points of these safety measures cannot be detected. Further, there is no safety mechanism which serves as manipulation defence in any other way.

SUMMARY

In an exemplary embodiment, the present invention provides a gateway device. The gateway device includes: a network adapter for connection to an IPv6 network; a fieldbus network adapter for connection to an associated fieldbus; and an address assignment device for configuring one or more virtual IPv6 network adapters for one or more devices connected to the fieldbus, wherein an individual IPv6 address corresponds to each device connected to the fieldbus.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
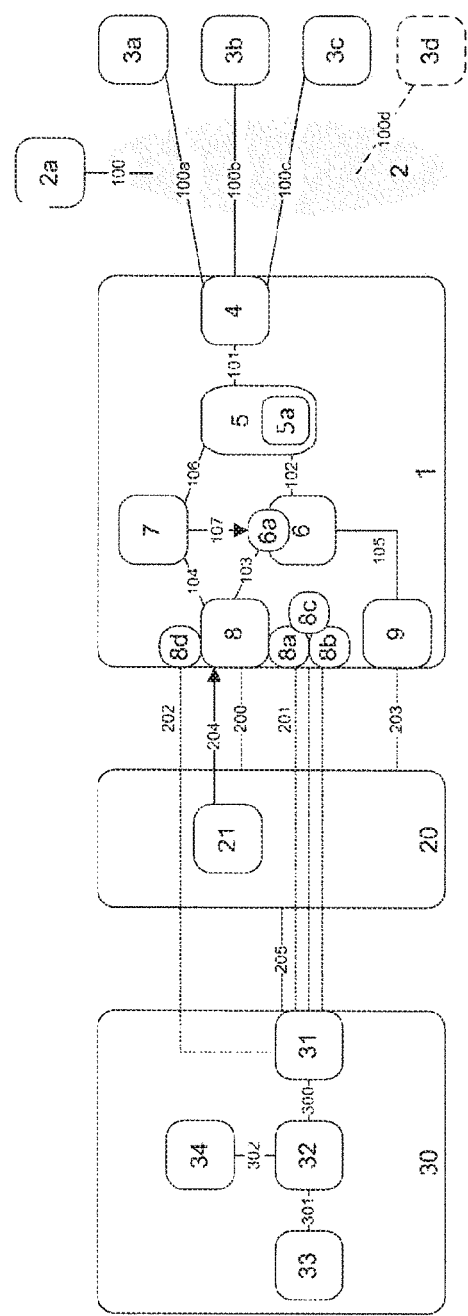
FIG. 1 is a schematic block diagram of a system with a gateway device according to an embodiment of the invention.

Exemplary embodiments of the present invention provide a device, a system and a method with which fieldbus devices can be connected to the Internet, wherein identification or addressing of fieldbus devices connectable to said fieldbuses, is possible.

According to an aspect of the invention, a devices comprises: (a) at least a network adapter for connection to an IPv6 network, (b) at least a fieldbus network adapter for connection to an associated fieldbus, and (c) an address assignment device for configuration of at least a virtual IPv6 network adapter having an individual IPv6 address for each device connectable to the fieldbus.

Instead of to an IPv4 network, the device, in particular the gateway device, is connected to an IPv6 network. An individual IPv6 address is assigned to each device connectable or connected to the fieldbus. There is no conversion to identification numbers or the like towards the IPv6 network. The IPv6 address is sufficient for unambiguously identifying a connected device.

According to a further aspect of the invention, the address assignment device is suitable for assigning an IPv6 interface identifier, preferably as a local part of an individual IPv6 address which is unique for the connected device and wherein the IPv6 address has an IPv6 prefix and the local part of the IPv6 address. Here the IPv6 prefix can be optionally changed at certain time intervals, particularly preferably after one day, e.g. by a network provider of a user.

A connected device is preferably always assigned the same IPv6 interface identifier, preferably the local part of an IPv6 address as is explained in detail below, even if the IPv6 prefix of a home network changes. Thus, a connected device at the gateway can be permanently identified.

According to a further aspect of the invention, the address assignment device has a protocol converter which is suitable for converting at least one part of a fieldbus protocol into an IPv6-capable representation and vice versa, wherein the IPv6 representation is a textual or binary representation.

The textual or binary representation of the fieldbus protocol generated by the protocol converter can be converted via IPv6 (and vice versa). The format is not fixed but can be proprietarily determined or standardized. Examples for a textual representation are eXtensible Markup Language (XML), JavaScript Object Notation (JSON), Windows-INI, comma-separated values (CSV), and examples for a binary representation are Abstract Syntax Notation One (ASN.1) or proprietary formats.

The protocol converter preferably has a connection component which is suitable for compiling or dividing device services of devices connected to the fieldbus. For example, simple device services of two or more devices can be compiled to a virtual complex device to which the several simple device services are assigned. Alternatively, two or more device services of one complex device can be divided to two or more virtual devices, wherein each device is assigned at least one of the device services. For example, a motion detector device can include the components motion detection and brightness detection. It is conceivable that said two (or else only one of the two) components are exported to the outside as two devices.

According to a still further aspect, the device optionally comprises a filter device which is preferably arranged between the network adapter and the address assignment device or the protocol converter.

According to a further aspect, the configuration component is adapted for performing settings of configuration of one or more of the following devices: the address assignment device or the protocol converter, the filter device and one of the network adapters. The configuration component is optionally suitable for requesting administration information, wherein the configuration component is connectable to an application server which can obtain information about devices connected to the fieldbus via said configuration component to which the application server has access rights, in a controlling and/or reading manner.

The configuration component can be accessible either via its own virtual address or via an IP6 address assigned to the gateway. A service provider intending to access the devices connected to the fieldbus in a controlling or reading manner can obtain information about these devices via said configuration component, such as e.g. characteristics like type, manufacturer information, or other metadata.

The scope of this information depends in general on the fieldbus technology and the connected devices as such. However, it is also conceivable that the gateway device is capable of supplying said readable information with further metadata (either via internal methods or via internal and external databases).

According to a further aspect, the filter device is suitable for implementing safety mechanisms, preferably for implementing an access protection and/or authentication and update functions, wherein the filter device preferably has a database comprising rules for safety mechanisms and access protection and the filter device is adjustable via the configuration component via the database.

The filter device can be used, depending on the implemented safety mechanisms, to make individual devices connected to the fieldbus visible or non-visible in the IPv6 network. This is useful to make devices which fulfil only a fieldbus-local function non-accessible. The filter settings can be made via a configuration channel, or they have already been determined by default settings or by other methods.

Thus, in addition to the access protection, the "concealing" of devices may be achieved so that said devices do not even obtain an IP address and thus are not visible to the outside. Preferably certain devices may be non-visible, only readable or entirely controllable, depending on the identity and authorization of the remote station.

According to a further aspect, the device can comprise at least an IPv4-capable network adapter for connection to an IPv4 network which is suitable for accessing at least a device connected to the fieldbus. The gateway device can fulfill the above-described function in an IPv4 network by further enabling on an IPv4 address the access to the devices connected to the fieldbus in a multiplexed manner.

The gateway device can have more than one fieldbus network adapter. Thus, various fieldbuses may be connected to the Internet via the gateway device.

A local network, such as a home network, may have two or more gateway devices connecting various fieldbuses. This can be advantageously when it is not possible for physical or electro-technical reasons to install several fieldbus technologies in a gateway device, e.g. due to radio interferences.

In the following the choice of the IPv6 address is explained.

A unicast IPv6 address (cf. http://de.wikipedia.org/w/index.php?title=IPv6&oldid=134400554) (https://en.wikipedia.org/wiki/IPv6) includes a so-called IPv6 prefix, a subnet identifier and an IPv6 interface identifier. Usually the router of a user gets one or more so-called IPv6 prefixes. The IPv6 interface identifier can have a length of 64 bits. Thus, a unique IPv6 address can be generated by combining said IPv6 prefix with the media access control (MAC) address of a physical network adapter (cf. EUI-64 method, http://en.wikipedia.org/w/index.php?title=IPv6 address&oldid=627579935#Modified EUI-64).

The here presented gateway device can then generate for each connected device its own virtual network adapter which obtains an own IPv6 address. To this end it can either choose MAC addresses from a predetermined domain in order to generate IPv6 addresses according to the above-described method or randomly determine said MAC addresses. In order to avoid an overlap with already existing IPv6 addresses in the local network, overlaps are checked via Neighbor Solicitation and Neighbor Advertisement. The mentioned predetermined MAC address domain can be adjusted via gateway configuration.

As another method, an existing DHCPv6 server can be used to obtain a new IPv6 address (cf. http://en.wikipedia.org/w/index.php?title=DHCPv6&oldid=611497664). Said server is usually to be found on the home router.

Alternatively, the DHCPv6 server is on another connected device or PC or else on an IP2x gateway. Here the DHCPv6 server can also be located in another subnet. IPv6 enables that DHCPv6 requests may be led to another subnet via so-called relaying and may then be answered by a DHCPv6 server.

In both methods attention is particularly paid that the local part of the IPv6 address (interface identifier) which is assigned to a device connected to the fieldbus remains always the same.

Upon alteration of the IPv6 prefix by the Internet Service Provider (ISP), the gateway device generates corresponding new IPv6 addresses or they are obtained by the DHCPv6 server. This address change is displayed via the configuration channel to service providers locally or in the wide area network.

The IPv6 Prefix Coloring is explained in the following in more detail.

It is up to an Internet Service Provider (ISP) to assign more than one IPv6 prefix to the home network of a user, e.g. for the improved control and division of the data traffic for specific services. Consequently, e.g. the mere Internet data traffic of telephone services and IPTV can be divided by assigning each of said services its own IPv6 prefix. The application-specific meaning of the respective IPv6 prefix is described in more detail and determined by metadata (cf. http://www.ietf.org/proceedings/87/slides/slides-87-6man-10.pdf and http://tools.ietf.org/html/draft-lepape-6man-prefix-metadata-00).

Thus, it is also possible that the Internet Service Provider (ISP) assigns its own IPv6 prefix for the gateway device. A network router such as a home router is preferably configured such that said IPv6 address domain can be assigned to the respective gateway device.

This solution is advantageous in that the data traffic can be routed individually in a wide area network (WAN) with this gateway, e.g. for better quality of service (QoS), safety, billing and the like and that overlapping of address domains with other devices can be avoided when assigning the local part of the IPv6 address (Ipv6 Interface Identifier).

The invention is advantageous in that such a device like a gateway device provides an individual representation in the IP network for each device connected to the fieldbus by assigning each device connected to the fieldbus its own IP address. This is not always possible in an IPv4 network since in a local area network (LAN) the number of devices is severely limited by the number of locally available IP addresses. It is also hardly possible to assign individual IP addresses an application-specific meaning. Furthermore, in an IPv4 network, a remote access, in particular via the Internet, is not possible since these local IP addresses are not visible and accessible in a WAN. Furthermore, the configuration effort for user and service provider in such a case is too great and error-prone. Moreover, there are often restrictions as to the number of local devices which can be operated by a network router. The number of fieldbus devices can easily exceed the locally available IP addresses.

By directly addressing the devices via an IPv6 address, they become individually visible both in the home network and in a wide area network and can be directly addressed. A deduction of identification numbers to IP addresses can be omitted.

An individual assignment of rights and access control can be carried out with the usual IP component, e.g. a firewall. A direct access via control applications can take place per device.

An IPv6 Prefix Coloring makes the data traffic with the gateway better and safer.

A further field of application of the invention is the use concerning a home gateway virtualized in the cloud for the connected home (cf. e.g. https://www.qivicon.com/). Such a home gateway generally includes at least a component for connecting to one or more local fieldbuses and a component for storing and processing data. The present invention now enables the replacement of the component for connecting the fieldbuses. Thus, the processing component of such a home gateway needs no longer be present locally but may be operated as virtual home gateway in the cloud which has access to the device connected to the fieldbus(es) according to the device of the invention. A gateway device described in this context and wherein the processing of aggregated data takes place in a central cloud server can be produced and distributed cheaper than an integrated home gateway for a smart home. Furthermore, the device of the invention operates in a more energy-saving way due to the reduced expense of components.

A further aspect of the invention relates to a system with a router connectable to an application server and having a gateway device as described above. The router is connectable to the gateway device or the router has at least a part of the gateway device. The router preferably comprises at least one of the following: at least a fieldbus network adapter, the address assignment device or the protocol converter, the filter device optionally with a database comprising rules for safety mechanisms and access protection and the configuration component.

According to a further aspect, the home router comprises a DHCPv6 server and/or a device passing the prefix of an IPv6 address newly assigned to the router to the address assignment device or the protocol converter. The address assignment device or the protocol converter assemble an individual IPv6 address from the prefix and an interface identifier for each device connected to the fieldbus or update the individual IPv6 address.

When a device connected to the fieldbus is discovered (Discovery), a new IPv6 address is internally assigned to this device by the address assignment device or the protocol converter, the address being composed of the IPv6 prefix and an IPv6 interface identifier. The prefix of the LAN assigned usually from outwards to the router can then be used by providing a DHCPv6 server passing said very prefix to the entire device. Alternatively, the so-called "Neighbor Discovery Protocol" can be used (cf. http://en.wikipedia.org/wiki/Neighbor_Discovery_Protocol and IETF RFC 4861, Neighbor Discovery for IP version 6 (IPv6)) wherein this information can also be exchanged. The achievement in both cases is that the IPv6 prefix is part of the address assignment or auto-configuration thereby enabling access from the outside of the LAN.

According to a further aspect, the system comprises the application server (Dienste-Server) having at least a physical IPv6-capable network adapter, a mapping component of IPv6 addresses to physical fieldbus devices, a service provider component and a component for configuration and administration.

A further aspect of the invention relates to a method for connecting fieldbus devices to the Internet, preferably by the above-described gateway device or the above-described system comprising the steps of:
connecting at least a network adapter to an IPv6 network,
connecting at least a fieldbus network adapter to a corresponding fieldbus and
configuring at least a virtual IPv6 network adapter with an individual IPv6 address for each
device connected to the fieldbus via an address assignment device.

According to a further aspect, the method comprises the further steps:
assigning an IPv6 interface identifier, preferably as a local part of an individual IPv6 address which is unique for the connected device, via the address assigning device, wherein the IPv6 address comprises an IPv6 prefix and the local part of the IPv6 address, wherein preferably the IPv6 prefix is changed at certain time intervals, particularly preferably after one day.

According to a further aspect, the method comprises the further steps:
converting at least one part of a fieldbus protocol into an IPv6-capable representation and vice versa via the address assignment device having a protocol converter, wherein the IPv6 representation is a textual or binary representation and compiling or dividing device services of devices connected to the fieldbus via the protocol converter, which preferably comprises a connecting component.

According to a further aspect, the method comprises the further steps:
carrying out configuration settings via a configuration component to at least one of the following devices: the address assignment device or the protocol converter, a filter device and one of the network adapter, wherein the filter device is preferably located between the network adapter and the address assignment device or the protocol converter.

According to a further aspect, the method comprises the further steps:
requesting administration information via the configuration component, wherein the configuration component is connectable to an application server which can obtain information via this configuration component about the devices connected to the fieldbus to which the application server has access rights in a controlling and/or reading manner.

According to a further aspect, the method comprises the further steps:
implementing safety mechanisms, preferably implementing an access protection and/or authentication and update functions via the filter device, wherein the filter device preferably comprises a database having rules for safety measures and access protection, and the filter device is adjustable via the database via the configuration component.

According to a further aspect, the method comprises the further steps:
making a device connected to the fieldbus visible or nonvisible for an application server in the IPv6 network fieldbus device, preferably for reading access and/or full control access to the device, via the filter device, depending on the implemented safety mechanisms.

The schematic block diagram shown in FIG. 1 relates to a system having a gateway device for connecting fieldbus devices to the Internet. The gateway device 1 is connected on the one hand to a fieldbus 2 and on the other hand to a network router, in the present case to a home router 20. The home router 20 is connected to an application server 30 via the Internet.

In this embodiment, four fieldbus devices 3a, 3b, 3c and 3d are connected to the fieldbus 2. Thereof, only three fieldbus devices 3a, 3b, 3c are connected to the physical fieldbus adapter 4 via corresponding data connections 100a, 100b, 100c and controllable and readable from the outside of the fieldbus. These devices are exported from the fieldbus. As is implied by the dashed line, the fieldbus device 3d is also connected to the fieldbus 2 via a data connection 100d, but only available inside the fieldbus 2. Moreover, a control device and reader 2a is connected to the fieldbus via a data connection 100, which can control and read out the devices 3a, 3b, 3c and 3d. The control device and reader 2a is meant for the fieldbus-internal control, in particular the fieldbus device 3d which is not exported and only known inside the fieldbus.

The gateway device 1 comprises a physical fieldbus network adapter 4 via which the connection to the fieldbus 2 is established. The physical fieldbus network adapter 4 is connected to a protocol converter 5 via a first internal data communication 101, the converter serving for converting a fieldbus protocol into an IPv6 representation. In this embodiment the protocol converter 5 comprises a connection component 5a which serves to compile or divide device services of devices 3a, 3b, 3c connected to the fieldbus 2. For example, simple services of two devices 3a and 3b can be combined to one new, complex device (e.g., a virtual device 3ab'). As a further example, several services of a complex device 3c can be divided into multiple devices (e.g., two virtual devices 3c' and 3c'').

In the present example, the protocol converter 5 is connected via second internal data communication 102 to a filter device 6. The filter device 6 has a database 6a comprising data and in particular rules for safety and access rules.

The gateway device 1 further comprises a physical IPv6 network adapter 8 which is connected to the filter device 6 via a third internal data communication 103.

The gateway device 1 further comprises a configuration component 7 which is connected to the physical IPv6 network adapter 8 via a fourth internal data communication 104.

In this example, the gateway device 1 furthermore comprises a physical IPv4 network adapter 9 which is connected to the filter device 6 via a fifth internal data communication 105.

The configuration component 7 is connected to the protocol converter 5 via a sixth internal data communication 106 for configuration.

A seventh internal data communication 107 serves as data communication between the configuration component 7 and filter device 6 for configuring the filter component and safety and access rules.

The physical IPv6 network adapter 8 serves for generating virtual IPv6 network adapters 8a, 8b and 8c which are assigned to the fieldbus devices 3a, 3b and 3c. The physical IPv6 network adapter 8 furthermore generates a virtual IPv6 network adapter 8d via which access from outside is possible to the configuration component 7 by an application server 30.

In the example, the network router 20 is connected to the gateway device 1 via a physical LAN connection 200. For each connected fieldbus device, a virtual IPv6 connection 201 is provided by the virtual IPv6 network adapters 8a, 8b, 8c and 8d to the network router 20 and from this router onwards to the Internet. The virtual IPv6 connection(s) 201 lead to an application server 30 which is located in the Internet.

In this example, the network router 20 comprises a DHCPv6 server 21. The DHCPv6 server 21 is connected to the physical IPv6 network adapter 8 via a connection 204 and suitable for executing a DHCPv6 address assignment.

The network router 20 is further connected to the physical IPv4 network adapter 9 via a virtual IPv4 connection 203.

The application server 30 has a physical IPv6 network adapter 31 connected to the Internet and communicating via a WAN connection 205 with the network router. The application server 30 furthermore comprises a mapping component 32 of IPv6 addresses to physical fieldbus devices, a service provider component 33 and a configuration and administration component 34 for configuration and administration of fieldbus devices. The physical IPv6 network adapter 31 is connected to the mapping component 32 via a data communication 300. The mapping component 32 is connected to the service provider component 33 via a data communication 310. The mapping component 32 is furthermore connected to the configuration and administration component 34 via a data communication 302.

Figure 2:
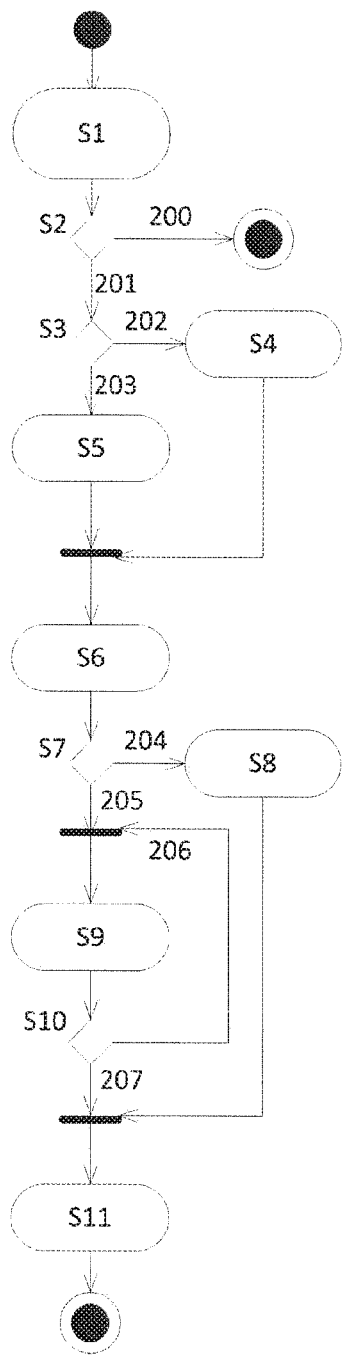
FIG. 2 is a schematic flow diagram of a further embodiment of the invention concerning a method for determining the IPv6 address for a connected device.

In the following, an embodiment of a method for determining the IPv6 address for a connected device is explained on the basis of FIG. 2. This flow diagram describes the registration of devices by assigning IPv6 addresses depending on whether there is a DHCPv6 server or not.

The flow diagram starts with step S1 where a device is connected to the fieldbus and is recognized by a gateway device.

In step S2, the configuration database is consulted and checked whether the connected device recognized by the gateway device is to be registered with IPv6. In case that the device is not to be registered, the method terminates and the activity is terminated at point 200.

In case that the device is to be registered, it is continued via 201 to step S3. In step S3, the configuration database is consulted and checked whether the same device has already been registered once and received an IPv6 interface identifier. In case that the device has already received an IPv6 interface identifier in the past, it is continued via 202 to step S4. In step S4, the IPv6 interface identifier assigned in the past is assigned to the device. It is continued with step S6. In case the device has not received an IPv6 interface identifier in the past, it is continued via 203 to step S5. In step S5, a first IPv6 interface identifier is determined for the device recognized by the gateway device. This may be done by a random algorithm. Alternatively, the identifier of the device recognized at the fieldbus is determined and therefrom a first IPv6 interface identifier determined. Hereinafter it is continued with step S6. In step S6, a virtual IPv6 network adapter is generated and registered for the device recognized by the gateway device.

In the following step S7 it is checked whether there is a relevant DHCPv6 server in the local network (LAN). When there is a relevant DHCPv6 server in the local network, it is continued via 204 to step S8. In step S8, the gateway device requests an IPv6 address at the DHCPv6 server for the determined IPv6 interface identifier of the device. It is continued with step S11.

When there is no relevant DHCPv6 server in the local network, it is continued via 205 to step S9. In step S9, an own IPv6 address can be assigned on the basis of the IPv6 interface identifier and the IPv6 address of the gateway device. This is done, e.g. by the "modified EUI-64 method". Optionally, a new IPv6 interface identifier is generated. Step S10 follows. In step S10, it is checked whether the assigned or determined IPv6 address has already been used in the local network. This is done, e.g. via the neighbor solicitation and neighbor advertisement method. When the address is already in use, it is continued via 206 and step S9 is repeated, i.e. the IPv6 address is again determined. If the address is not yet used, it is continued via 207 and the method re step S11 is continued.

In step S11, the assigned IPv6 address and the determined IPv6 interface identifier for the determined device are stored in the configuration database. The device connected to the fieldbus can be contacted from the outside via said stored address.

Although the invention is shown and described in detail with the Figures and the corresponding description, this depiction and detailed description are illustrative and exemplary and not considered to be a restriction of the invention. It is clear that skilled persons may perform changes and modifications without going beyond the scope and gist of the following claims. In particular, the invention also comprises embodiments with any combination of features which are mentioned or shown above below with regard to various embodiments. Additionally, statements made herein characterizing the invention refer to an embodiment of the invention and not necessarily all embodiments.

The invention also comprises individual features in the Figures even though they are shown in combination with different features and/or are not mentioned above or below. The alternatives of embodiments described in the Figures and the description and individual alternatives may also be excluded from the subject-matter of the invention or the disclosed subject-matter. The disclosure comprises embodiments exclusively comprising the features described in the claims and the embodiments and also those comprising additional other features.

Furthermore, the term "comprising" and derivations thereof do not exclude other elements or steps. Likewise the indefinite article "a" and derivations thereof do not exclude a plurality. The functions of several features mentioned in the claims can be fulfilled by a unity or a step. The terms "basically", "about", "approximately" and the like in combination with a characteristic or a value define in particular also exactly the characteristic or the value. The terms "about" and "approximately" in combination with a fixed number or number range may refer to a value or range which is within 20%, 10%, 5% or 2% of the mentioned value or range. A computer program may be stored and/or distributed on an appropriate medium, e.g. on an optical storage medium or fixed medium which is provided together with or as part of another hardware. It may also be distributed in another form, such as via the Internet or other wired or non-wired telecommunications systems. In particular, a computer program can e.g. be a computer program product stored on a computer-readable medium which is configured to be executed in order to implement a method, in particular the method of the invention. All reference signs in the claims are not to be regarded as restricting the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A gateway device comprising:
a network adapter for connection to an IPv6 network;
a fieldbus network adapter for connection to a fieldbus; and
one or more processors configured to:
configure one or more virtual IPv6 network adapters for one or more devices connected to the fieldbus, wherein a respective IPv6 address corresponds to each respective device connected to the fieldbus;
implement safety mechanisms, the safety mechanisms including access protection functions and/or authentication and update functions, wherein the gateway device further comprises a database with rules for the safety mechanisms; and
switch a device connected to the fieldbus between a visible state and a non-visible state for an application server in the IPv6 network based on the implemented safety mechanisms.

2. The gateway device according to claim 1, wherein the one or more processors are further configured to assign a unique IPv6 interface identifier for each device connected to the fieldbus; and
wherein each respective IPv6 address comprises an IPv6 prefix and a local part of the respective IPv6 address.

3. The gateway device according to claim 1, wherein the one or more processors are further configured to convert at least a part of a fieldbus protocol into an IPv6-capable representation and vice versa, and wherein the IPv6-capable representation is a textual or binary representation.

4. The gateway device according to claim 1, wherein the one or more processors are further configured to request administration information, wherein the gateway device is connectable to an application server configured to obtain information about devices connected to the fieldbus, and wherein the application server has access rights to the gateway device in a controlling and/or reading manner.

5. The gateway device according to claim 1, further comprising:
an IPv4-capable network adapter for connection to an IPv4 network which is suitable for access to at least one device connected to the fieldbus.

6. A system, comprising:
a router;
an application server; and
a gateway device;
wherein the router is connectable to the application server;
wherein the router is connected to the gateway device or the router comprises a part of the gateway device;
wherein the gateway device comprises a network adapter for connection to an IPv6 network and a fieldbus network adapter for connection to an associated fieldbus, and wherein the gateway device is configured to:
configure one or more virtual IPv6 network adapters for one or more devices connected to the fieldbus, wherein a respective IPv6 address corresponds to each respective device connected to the fieldbus;
implement safety mechanisms, the safety mechanisms including access protection functions and/or authentication and update functions, wherein the gateway device comprises a database with rules for the safety mechanisms; and
switch a device connected to the fieldbus between a visible state and a non-visible state for an application server in the IPv6 network based on the implemented safety mechanisms.

7. The system according to claim 6, wherein the router is configured to pass on an IPv6 prefix of an IPv6 address newly assigned to the router to the gateway device, wherein the gateway device is configured to compile or update an IPv6 address from the IPv6 prefix and an IPv6 interface identifier.

8. The system according to claim 6, further comprising the application server, wherein the application server comprises:
at least a physical IPv6-capable network adapter; and
a mapping component for mapping IPv6 addresses to physical fieldbus devices.

9. The system according to claim 6, wherein the router comprises a DHCPv6 server.

10. A method of connecting fieldbus devices to the Internet, the method comprising:
connecting a network adapter of a gateway device to an IPv6 network;
connecting a fieldbus network adapter of the gateway device to a fieldbus; and
configuring, by the gateway device, one or more virtual IPv6 network adapters for one or more devices connected to the fieldbus, wherein a respective IPv6 address corresponds to each device connected to the fieldbus;
implementing, by the gateway device, safety mechanisms, the safety mechanisms including access protection functions and/or authentication and update functions, wherein the gateway device comprises a database with rules for the safety mechanisms; and
switching, by the gateway device, a device connected to the fieldbus between a visible state and a non-visible state for an application server in the IPv6 network based on the implemented safety mechanisms.

11. The method according to claim 10, further comprising:
assigning, by the gateway device, a unique IPv6 interface identifier for each device connected to the fieldbus;
wherein each respective IPv6 address has an IPv6 prefix and a local part of the respective IPv6 address.

12. The method according to claim 10, further comprising:
converting, by the gateway device, at least a part of a fieldbus protocol into an IPv6-capable representation and vice versa, wherein the gateway device has a protocol converter, and wherein the IPv6-capable representation is a textual or binary representation; and
compiling or dividing device services of devices connected to the fieldbus via the protocol converter.

13. The method according to claim 10, further comprising:
requesting, by the gateway device, administration information, wherein the gateway device is connectable to an application server which is configured to obtain information about devices connected to the fieldbus, wherein the application server has access rights to the gateway device in a controlling and/or reading manner.

* * * * *